US012652222B2

(12) United States Patent
Vasseur et al.

(10) Patent No.: US 12,652,222 B2
(45) Date of Patent: Jun. 9, 2026

(54) MAKING A WHAT-IF SCENARIO EVALUATION IN A GREEN ELASTIC NETWORK WITH PARTIAL TRAFFIC AND TOPOLOGY INFORMATION

(71) Applicant: Cisco Technology, Inc., San Jose, CA (US)

(72) Inventors: Jean-Philippe Vasseur, Combloux (FR); Grégory Mermoud, Venthône (CH); Eduard Schornig, Haarlem (NL); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/608,336

(22) Filed: Mar. 18, 2024

(65) Prior Publication Data

US 2025/0293938 A1      Sep. 18, 2025

(51) Int. Cl.
| | |
|---|---|
| *G06F 15/177* | (2006.01) |
| *H04L 41/0833* | (2022.01) |
| *H04L 41/12* | (2022.01) |
| *H04L 41/142* | (2022.01) |
| *H04L 41/147* | (2022.01) |
| *H04L 41/16* | (2022.01) |

(52) U.S. Cl.
CPC .......... *H04L 41/12* (2013.01); *H04L 41/0833* (2013.01); *H04L 41/142* (2013.01); *H04L 41/147* (2013.01); *H04L 41/16* (2013.01)

(58) Field of Classification Search
CPC ... H04L 41/12; H04L 41/0833; H04L 41/142; H04L 41/147; H04L 41/16
See application file for complete search history.

(56) References Cited

U.S. PATENT DOCUMENTS

| | | |
|---|---|---|
| 2012/0063323 A1 | 3/2012 | Mortier et al. |
| 2015/0244578 A1* | 8/2015 | Grosso .................. H04L 45/127 |
| | | 709/223 |
| 2017/0331694 A1 | 11/2017 | Crickett et al. |
| 2019/0386921 A1 | 12/2019 | Pignataro et al. |
| 2022/0006701 A1 | 1/2022 | Patel et al. |

(Continued)

OTHER PUBLICATIONS

Chen R.T.Q., et al., "Neural Ordinary Differential Equations", 32nd Conference on Neural Information Processing Systems (NeurIPS 2018), Jun. 19, 2018, pp. 1-13.

(Continued)

*Primary Examiner* — Padma Mundur
(74) *Attorney, Agent, or Firm* — Merchant & Gould P.C.; Kenneth J. Heywood

(57) ABSTRACT

In one implementation, a device queries an ontology that represents entities in a computer network and their relationships for a particular topology in the computer network. The device computes a mathematical system that represents traffic in the particular topology, based on traffic for only a portion of the particular topology. The device uses the mathematical system to compute traffic in the particular topology for a potential change to the particular topology expected to reduce energy consumption by the computer network. The device causes, based in part on the traffic computed using the mathematical system, the potential change to be made to the computer network.

20 Claims, 17 Drawing Sheets

(56) References Cited

U.S. PATENT DOCUMENTS

| | | | | |
|---|---|---|---|---|
| 2022/0385569 | A1* | 12/2022 | Kolar | H04L 45/08 |
| 2022/0393947 | A1 | 12/2022 | Strom et al. | |
| 2024/0169016 | A1* | 5/2024 | Park | G06F 17/13 |
| 2024/0323826 | A1* | 9/2024 | Karapantelakis | H04W 48/18 |
| 2024/0422577 | A1* | 12/2024 | Mitra | H04W 24/02 |

OTHER PUBLICATIONS

GITHUB: "Differentiable ODE Solvers with Full GPU Support and O(1)-Memory Backpropagation", retrieved from https://github.com/rtqichen/torchdiffeq on Mar. 6, 2024, 7 Pages.
GITHUB: "Diffrax: Numerical Differential Equation Solvers in JAX. Autodifferentiable and GPU-Capable", retrieved from https://github.com/patrick-kidger/diffrax on Mar. 6, 2024, 4 Pages.
Hasani R., et al., "Closed-form Continous-time Neural Networks", arXiv:2106.13898v2 [cs.LG], Mar. 2, 2022, pp. 1-40.

* cited by examiner

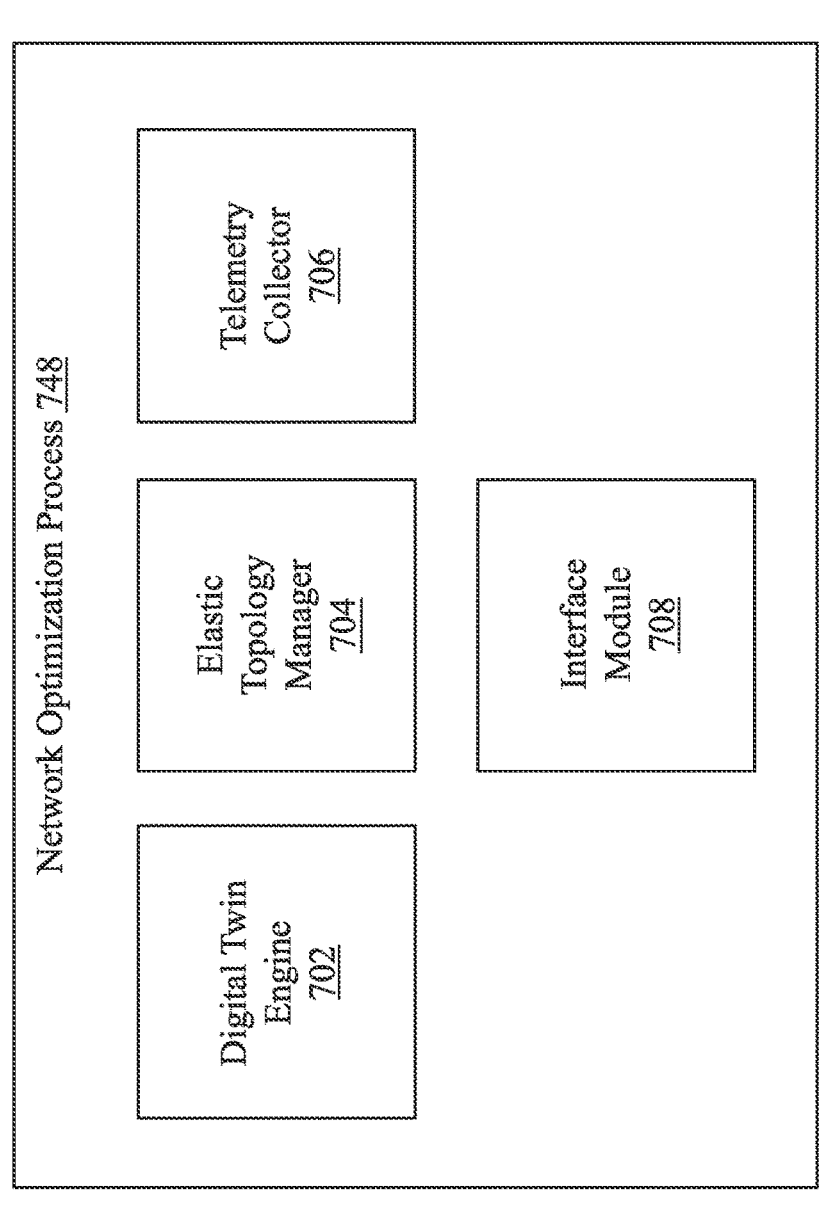
FIG. 7

Metrics
808

Ontology
806

Digital Twin Engine 702

What-If Engine 906

Usage Pattern Analyzer 904

Topology Generator 902

Energy & Demand Forecasting 824

Energy Profiling 822

1100

```
# Query the entire topology except for endpoints
with D1 := Device {
    serial
} select D1{
    serial,
    name,
    manufacturer,
    neighbors := ( select D2 := Device {
        serial,
        name
    } filter
        .interfaces.connections in D1.interfaces.connection
        # Exclude the router itself
        and .serial != D1.serial
    ),
} filter D1 is (Router | Switch | WirelessAP)
```

1200

client-MacBook-Pro-Satine client-Alexa_Office client-Roborockclient-Dishwasher client-XBOX client-Sonos-Kitchen client-shellyplug-Meraki-MX67W client-shellyplug-Meraki-Z3C ap-ho-rie-ap01 client-linux client-Sonos-Bathroom client-n/a client-shellyplug-Meraki-MS220 client-Bose-SB500

TY_WR client-ho-rie-rt01 client-car-359 client-linux-3 client-Sonos-Bedroom switch-ho-rie-sw01 client-shellyplug-Meraki-MS120 switch-ho-rie-sw02 client-Home-TE01 client-jump-host-359 router-ho-rie-rt01 client-ho-lab-rt01 uplink-172.31.128.4 uplink-192.168.0.128

FIG. 12

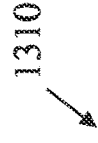
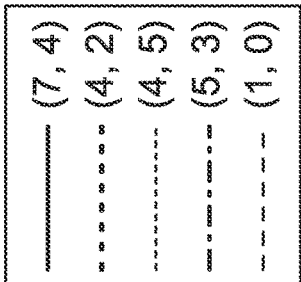
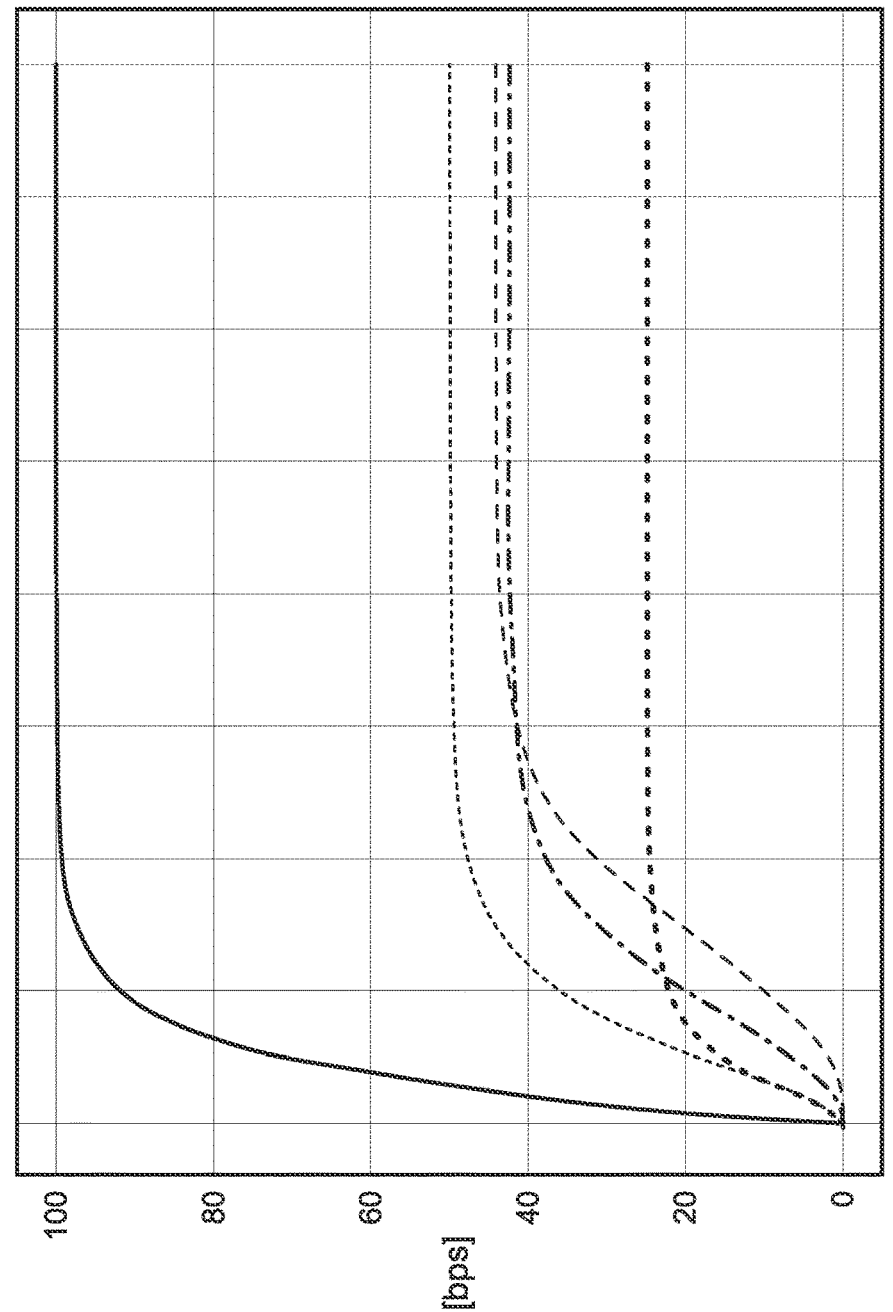
FIG. 13B

1400

1405
Start

1410
Query Ontology for Network Topology

1415
Compute Mathematical System that Represents Traffic in Topology

1420
Use Mathematical System to Compute Traffic for Potential Change to Topology 1425
Cause Change to Be Made in Network 1430
End

MAKING A WHAT-IF SCENARIO EVALUATION IN A GREEN ELASTIC NETWORK WITH PARTIAL TRAFFIC AND TOPOLOGY INFORMATION

TECHNICAL FIELD

The present disclosure relates generally to computer networks, and, more particularly, to making a what-if scenario evaluation in a green elastic network with partial traffic and topology information.

BACKGROUND

In recent years, the global landscape has been marked by an escalating demand for green initiatives, such as reducing energy consumption across various industries. This is due to factors such as climate change and an overall push towards operational efficiency. However, these efforts also come at a time when networking technologies and their associated resource demands are experiencing unprecedented growth, largely fueled by the digital transformation of economies, the proliferation of cloud services, and the roll out of next-generation networks, such as 5G cellular networks.

Traditionally, networks have attempted to meet their increasing user demands, while still meeting their service level agreements (SLAs), by overprovisioning. Under this strategy, the network capacity is significantly expanded in anticipation of future growth and/or bursts of demand. While doing so simplifies network design and operation, it also results in inefficiencies from a green perspective, as over-provisioning also means that the resources of a network will remain idle for extended periods of time, thereby consuming more energy than actually needed.

Even with the ability to elastically scale the network to conserve energy, networks are complex systems and making a configuration change to one device can have a cascading effect on many other devices. Without a mechanism to evaluate what-if scenarios before making such a change, doing so can lead to situations in which the performance of the network is degraded, while attempting to conserve energy.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 7 illustrates an example architecture to implement an artificial intelligence (AI)-driven elastic network to reduce energy consumption;

FIG. 12 illustrates an example topology retrieved using the query from FIG. 11;

FIGS. 13A-13B illustrate an example of solving a differential equation-based representation of a network topology.

DESCRIPTION OF EXAMPLE IMPLEMENTATIONS

Overview

According to one or more implementations of the disclosure, a device queries an ontology that represents entities in a computer network and their relationships for a particular topology in the computer network. The device computes a mathematical system that represents traffic in the particular topology, based on traffic for only a portion of the particular topology. The device uses the mathematical system to compute traffic in the particular topology for a potential change to the particular topology expected to reduce energy consumption by the computer network. The device causes, based in part on the traffic computed using the mathematical system, the potential change to be made to the computer network.

Other embodiments are described below and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
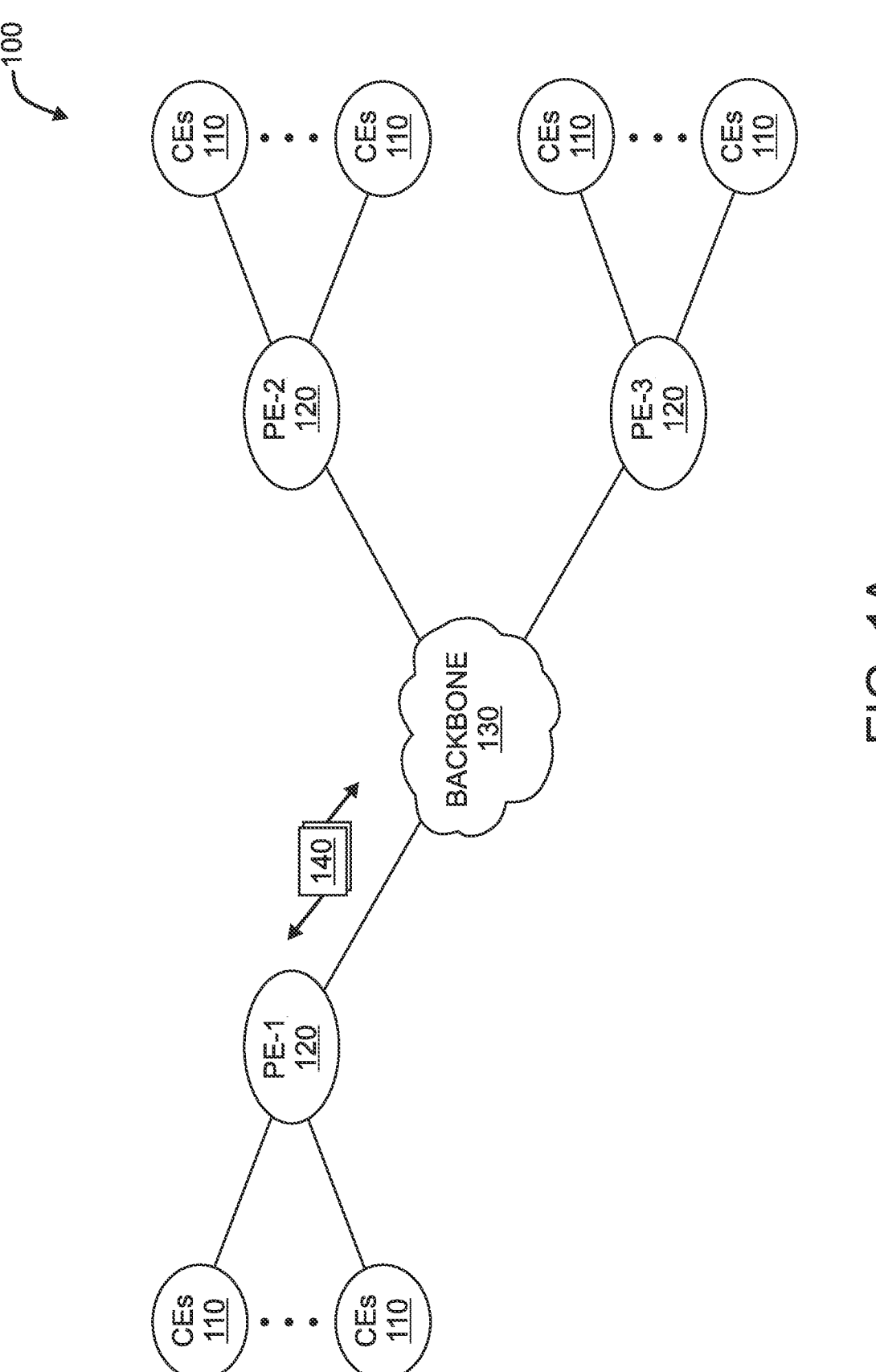
FIGS. 1A-1B illustrate an example communication network.

FIG. 1A is a schematic block diagram of an example computer network (e.g., network 100) illustratively comprising nodes/devices, such as a plurality of routers/devices interconnected by links or networks, as shown. For example, customer edge (CE) routers (e.g., router 110) may be interconnected with provider edge (PE) routers 120 (e.g., PE-1, PE-2, and PE-3) in order to communicate across a core network, such as an illustrative network backbone (e.g., network backbone 130). For example, router 110, router 120 may be interconnected by the public Internet, a multiprotocol label switching (MPLS) virtual private network (VPN), or the like. Data packets 140 (e.g., traffic/messages) may be exchanged among the nodes/devices of the computer network (e.g., network 100) over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router (e.g., router 110) shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement (SLA), whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router (e.g., router 110) connected to PE-2 and a second CE router (e.g., router 110) connected to PE-3.

Figure 1B:
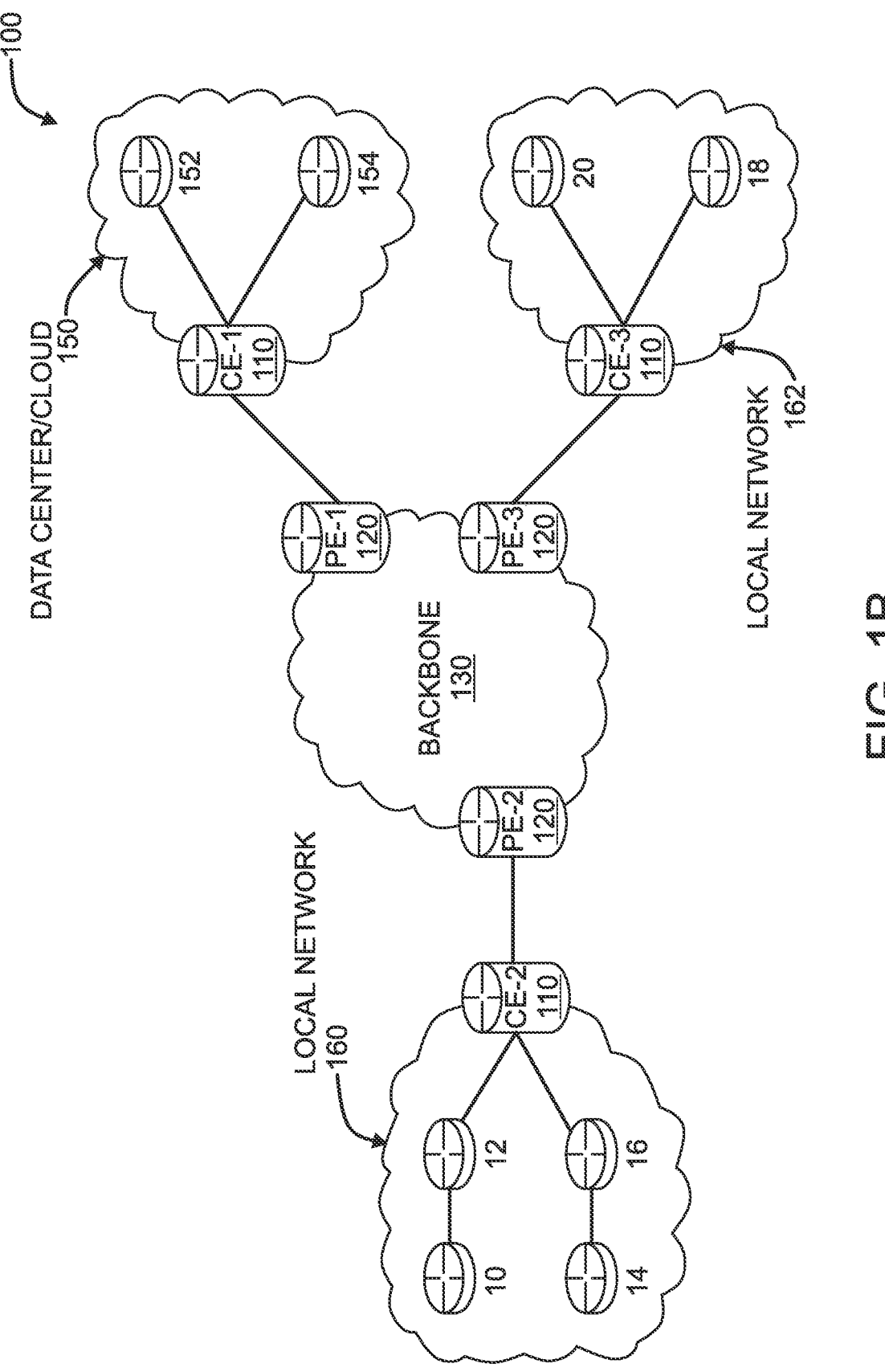

FIG. 1B illustrates an example of network 100 in greater detail, according to various implementations. As shown, network backbone 130 may provide connectivity between devices located in different geographical areas and/or different types of local networks. For example, network 100 may comprise local and/or branch networks that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in network backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
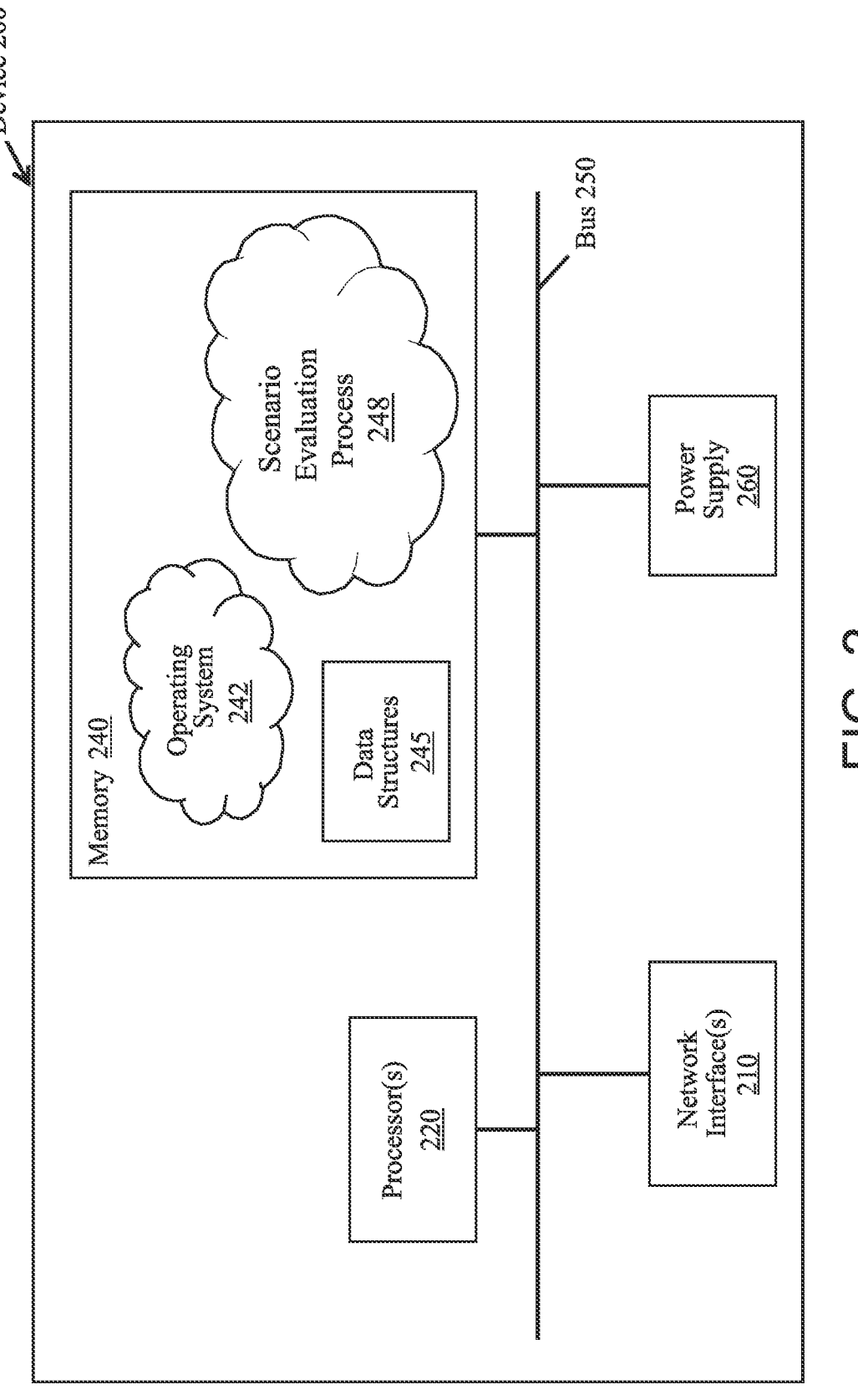
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers (e.g., router 120), CE routers (e.g., router 110), nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces (e.g., network interfaces 210), one or more processors (e.g., processor(s) 220), and a memory 240 interconnected by a system bus 250 and powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, network optimization process 248 may include computer executable instructions that, when executed by processor(s) 220, cause device 200 to perform the techniques described herein. To do so, in some implementations, network optimization process 248 may utilize machine learning. In general, machine learning is concerned with the design and the development of techniques that take as input empirical data (such as network statistics and performance indicators) and recognize complex patterns in these data.

In various implementations, network optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

As noted above, in software defined WANs (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Typically, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is often performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
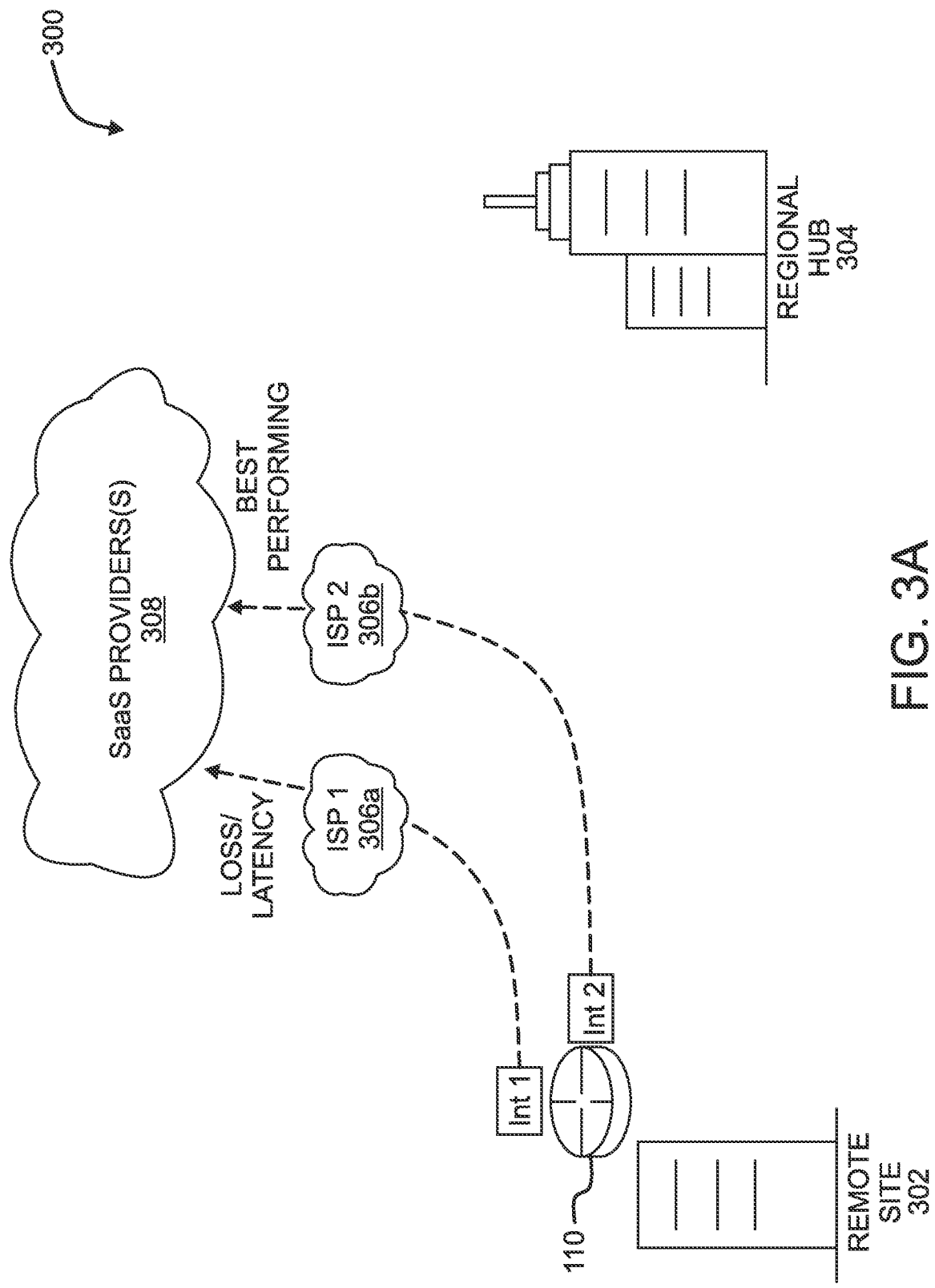
FIGS. 3A-3B illustrate example network deployments.
Figure 3B:
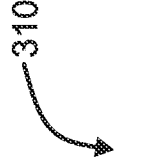

FIGS. 3A-3B illustrate example network deployments (e.g., network deployment 300, network deployment 310, respectively). As shown, a router 110 located at the edge of a remote site 302 may provide connectivity between a local area network (LAN) of the remote site 302 and one or more cloud-based, SaaS providers (e.g., provider(s) 308). For example, in the case of an SD-WAN, router 110 may provide connectivity to SaaS provider(s) (e.g., provider(s) 308) via tunnels across any number of networks 306. This allows clients located in the LAN of remote site 302 to access cloud applications (e.g., Office 365™, Dropbox™, etc.) served by SaaS provider(s) (e.g., provider(s) 308).

As would be appreciated, SD-WANs allow for the use of a variety of different pathways between an edge device and a SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., network interfaces 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider (s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
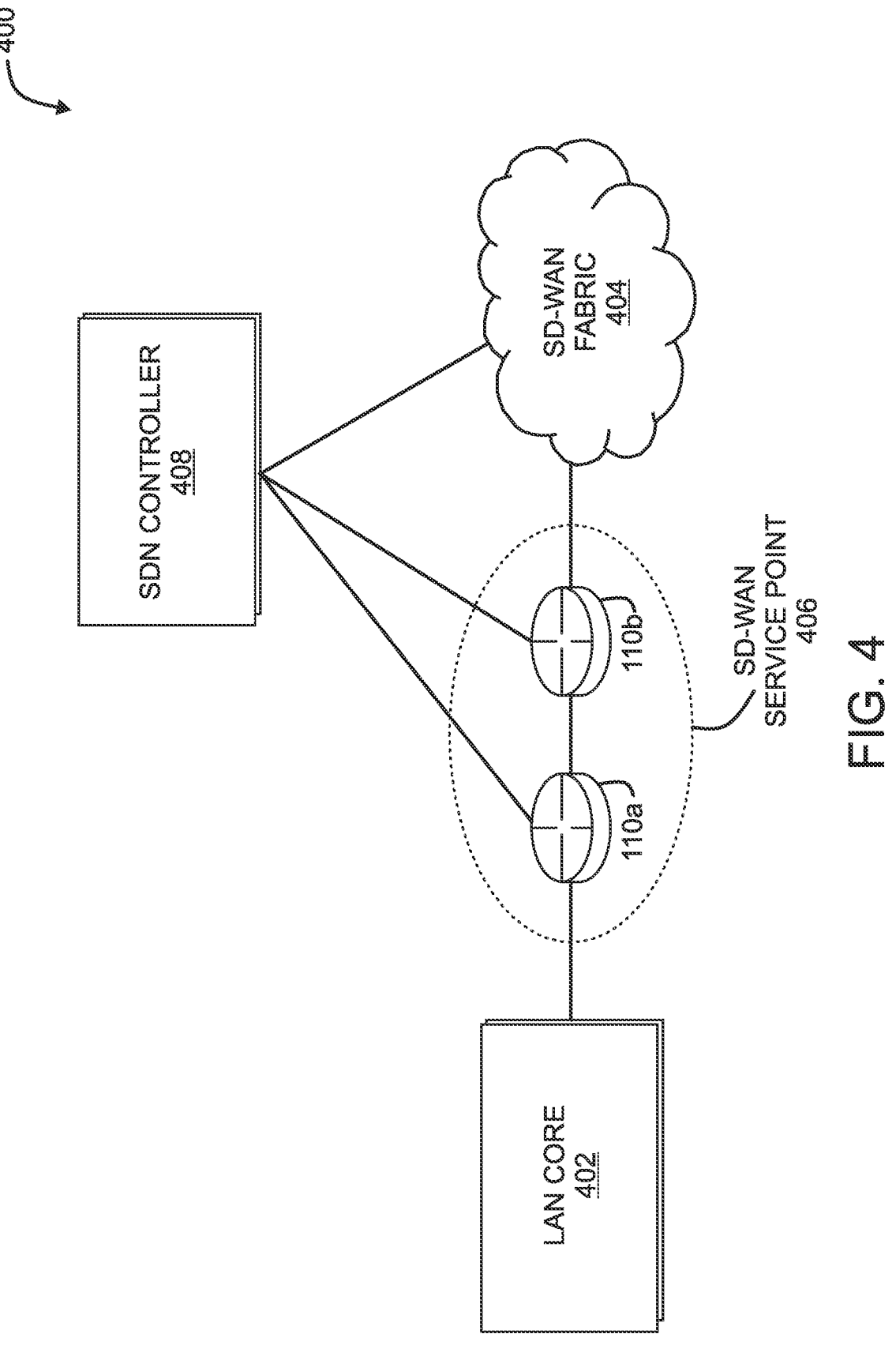
FIG. 4 illustrates an example of a software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging a SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of service provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, application aware routing generally refers to the ability to route traffic so as to satisfy the requirements of the application, as opposed to exclusively relying on the (constrained) shortest path to reach a destination IP address. Various attempts have been made to extend the notion of routing, constrained shortest path first (CSPF), link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application.

Figure 5:
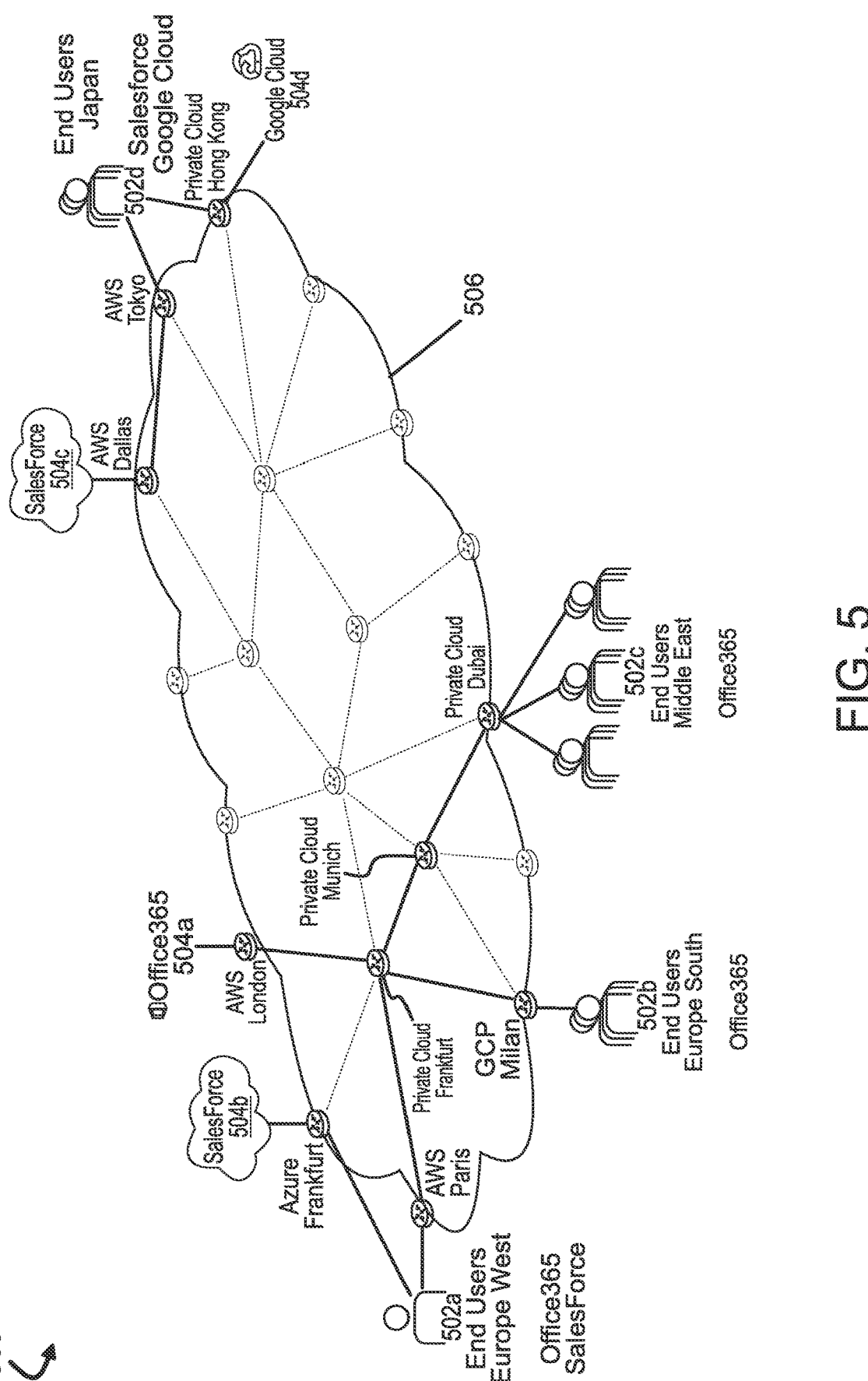
FIG. 5 illustrates an example of a cloud network architecture.

FIG. 5 illustrates an example of a cloud network architecture 500. The cloud network architecture 500 may be a geographically distributed system designed to facilitate communications and interactions among end users 502 (e.g., 502*a*-502*d*) and cloud-hosted applications 504 (e.g., 504*a*-504*d*) across various locations. Such applications may include a first application 504*a* (Office365), a second application 504*b* (e.g., a first instance of Salesforce), a third application 504*c* (e.g., a second instance of Salesforce), a fourth application 504*d* (e.g., Google Cloud), etc. Distributed across network 506 may be any number of end users 502 at different locations that access the various instances of the cloud-hosted applications 504. Communication between the end users 502 and the cloud-hosted applications 504, which may be hosted across multiple cloud platforms (e.g., Azure, AWS, Google Cloud, private cloud, etc.), may occur via data communication across network pathways between nodes of network 506.

As noted above, energy and other resource costs have been on the rise, significantly impacting both households and major industries. For instance, electricity prices in some regions have surged by twenty to thirty percent within a year. This increase has been attributed to various factors such as heightened demand and geopolitical issues affecting fuel supplies. Additionally, the energy consumption in key sectors like technology is noteworthy. Data centers, crucial for our digital world, consume about one to two percent of global energy, translating to hundreds of terawatts annually. This amount is only increasing. Furthermore, the telecom industry is also a significant energy consumer. For example, it's estimated that global telecoms use over sixty billion kilowatt-hours of energy per year, a figure that's growing with the expansion of networks like 5G.

The urgency for energy saving is accentuated by both economic and environmental needs. Decreasing energy usage is pivotal in combating climate change, as it reduces the demand for fossil fuels, thereby lessening greenhouse gas emissions. Simple measures like adopting energy-efficient appliances and mindful usage can have profound impacts. For large tech companies and data centers, energy-saving measures are even more crucial due to their high energy demands. The combined efforts of individuals and large enterprises in reducing energy usage can significantly contribute to environmental protection.

"Green IT" is being ushered to the forefront against this backdrop. This approach is exemplified by the practice of using information technology in a way that minimizes environmental impact, emphasizing resource efficiency. For instance, the adoption of energy-efficient servers and optimized data center layouts can markedly reduce energy consumption. In the telecom sector, innovations such as energy-efficient network technologies can substantially cut down power usage. The implementation of Green IT not only aids in environmental conservation but also offers economic benefits through reduced energy costs. By integrating energy-saving measures and Green IT practices, substantial progress can be realized in creating a sustainable and eco-friendly future, addressing both the escalating energy demands and the urgent need to protect our environment.

For example, traditional network designs have approached resource scaling through a traffic engineered network approach or an overprovisioned network approach. The traffic engineered network approach may include operating the network according to the principle that considering a given traffic demand and network capacity, an optimal traffic placement may be found to meet SLAs. This approach is sometimes applied in interior gateway protocol (IGP) traffic engineered (TE) technologies, multiprotocol label switching (MPLS) TE technologies, path computation element (PCE) technologies, etc. The pros of this approach include cost reduction (as compared to over-provisioning)

and high SLA/SLO satisfaction. The cons of this approach are that it has high complexity and is inflexible to sudden demand changes.

The overprovisioned network approach may include operating the network according to the principle that network traffic demand can be monitored and the network capacity may be overprovisioned to meet current demands and potential demand fluctuations (e.g., increased demand). This approach is sometimes applied IP with limited IGP-based TE technologies, etc. The pros of this approach include its simplicity. The cons of this approach are that it cannot be sustained in terms of return on investment (ROI) (e.g., issues with over-the-top providers). That is, it is a very costly approach with respect to owning and operating idle capacity out of an abundance of caution.

To summarize, networks have been vastly differing in terms of design principles: some of them have adopted an "over-provisioning" strategy according to which lots of resources are provisioned thus allowing for more simple designs (e.g., no QoS, no complex TE, ease of troubleshooting, etc.). In contrast, other networks have been designed with limited and highly optimized resources, thus requiring the use of more complex technologies to optimize traffic, SLA, and so on. In all cases, current communication networks have traditionally been designed with an "always-on" approach, with network equipment continuously running at full speed/capabilities, resulting in a considerable amount of energy being drained, often unnecessarily in the context of actual demand. Overprovisioning of network equipment (e.g., deploying more, or bigger hardware) in expectation of usage growth down the line, can lead to additional energy wastage until such growth materializes.

However, for most networks, traffic demand is not constant and usually follows daily cyclical patterns with periods of highs and lows (e.g., see network traffic usage time series 600). In enterprise environments, the network is predominantly utilized during traditional 9:00 to 17:00 business hours, with little or no use outside this interval at most locations. A similar observation can be made in the context of Service Provider Networks, where peak network load is usually in the 17:00 to 22:00 before gradually slowing down over the night.

Figure 6:
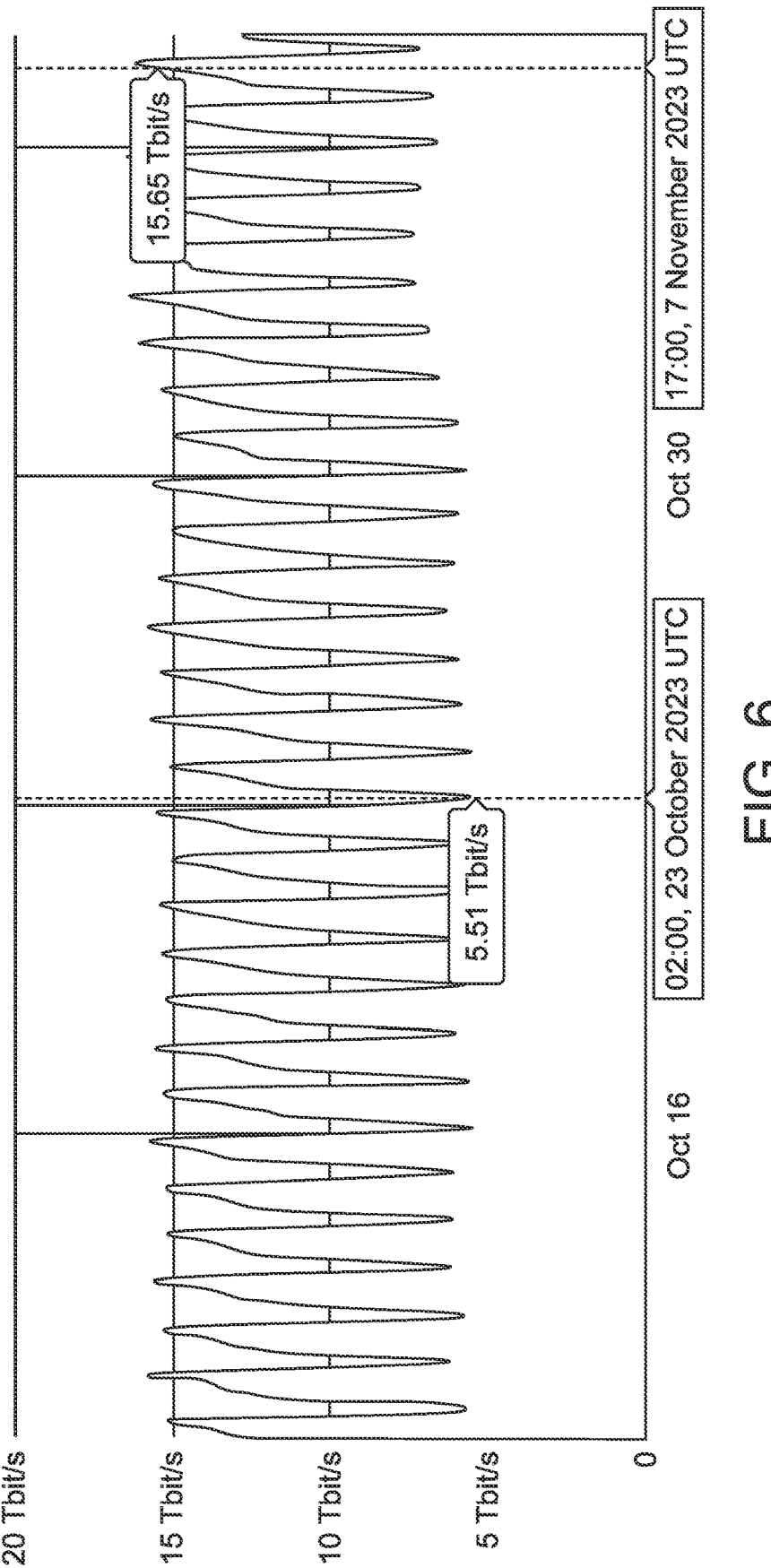
FIG. 6 illustrates an example of a network traffic usage time series.

For instance, FIG. 6 illustrates an example of a network traffic usage time series 600. As shown, network traffic usage time series 600 illustrates the fluctuation in network resource demands that cyclically occur over a period of time. In order for networks to accommodate this traffic in a manner that will satisfy SLA requirements, the network must be adequately provisioned with network resources (e.g., computational resources, communication resources, infrastructure, equipment, power, etc.) in a manner than can accommodate cyclical traffic bursts.

The network traffic usage time series 600 may be a DE-CIX Internet Exchange network traffic usage graph illustrating network traffic utilization over a thirty-day period (e.g., Oct. 9, 2023-Nov. 8, 2023). In network traffic usage time series 600, traffic usage cycles between lows of approximately six terabits per second and highs of approximately fifteen terabits per second over twenty-four-hour periods. As can be appreciated from network traffic usage time series 600, the network must be provisioned in order to handle the fifteen terabits per second load. However, the network resources in place to accommodate the fifteen terabits per second load are laying idle and are consequently underutilized when the network is experiencing the six terabits per load.

Facing resource consumption challenges and increasing environmental concerns, organizations of all sizes are now looking for ways to reduce the energy consumption of their communications networks. However, there are no existing mechanisms that can balance resource consumption/conservation with the necessity of SLA/QoE satisfaction.

AI-Driven Elastic Network to Reduce Energy Consumption

According to various embodiments, the techniques herein allow for the creation of AI-driven elastic networks that are able to reduce energy consumption, while still satisfying the various SLAs of the applications that they support. For simplicity, such a network is also referred to herein as a "GreenNetAI network." In some aspects, GreenNetAI networks may operate according to the principle that, considering a given traffic demand, the objective is to make the network elastic and reduce energy consumption, while preserving SLAs/QoE and avoiding traffic disruption. More specifically, the introduced GreenNetAI networks may be elastic networks capable of dynamically adapting their network architectures, configurations, equipment, etc. to meet traffic demand in a manner that reduces/minimizes resource consumption, while ensuring little to no traffic disruptions and that their SLAs are satisfied.

As described in greater detail below, a GreenNetAI network may operate by leveraging various mechanisms that can be used at the scale of a large enterprise network, to conserve resources, save energy, reduce costs, reduce greenhouse gas (GHG) emissions, increase operation efficiency, etc. while maintaining Quality of Experience (QoE), according to specific constraints and objectives. This approach operates on the wide range of levers and arbitrage opportunities available in networking. For example, in a given network traffic may still be able to flow through some other path with a worse but still acceptable SLA while some more expensive (e.g., from a resource consumption perspective) devices or paths are powered down. In some instances, these techniques main QoE by making use of digital twins, various models (e.g., for resource consumption), network state retrievals, and/or the monitoring of network QoE and SLA metrics in the form of positive/negative feedback.

Illustratively, the techniques described herein may be performed by hardware, software, and/or firmware, which may include computer executable instructions executed by the processor(s) 220 (or independent processor of network interfaces 210) to perform functions relating to the techniques described herein, such as in conjunction with network optimization process 248.

Operationally, FIG. 7 illustrates an example architecture 700 for implementing a GreenAINet network, according to various implementations. At the core of architecture 700 is network optimization process 248, which may be executed by a controller for a network or another device in communication therewith. For instance, network optimization process 248 may be executed by a controller for a network (e.g., SDN controller of an SD-WAN network, a controller of a cloud network, etc.), a particular networking device in the network (e.g., a router, a firewall, etc.), a server, another device or service in communication therewith, or the like.

As shown, network optimization process 248 may include any or all of the following components: a digital twin engine 702, elastic topology manager 704, a quality of telemetry collector 706, and/or a user interface module 708. As would be appreciated, the functionalities of these components may be combined or omitted, as desired. In addition, these components may be implemented on a singular device or in a distributed manner, in which case the combination of executing devices can be viewed as their own singular device for purposes of executing network optimization process 248.

Figure 8:
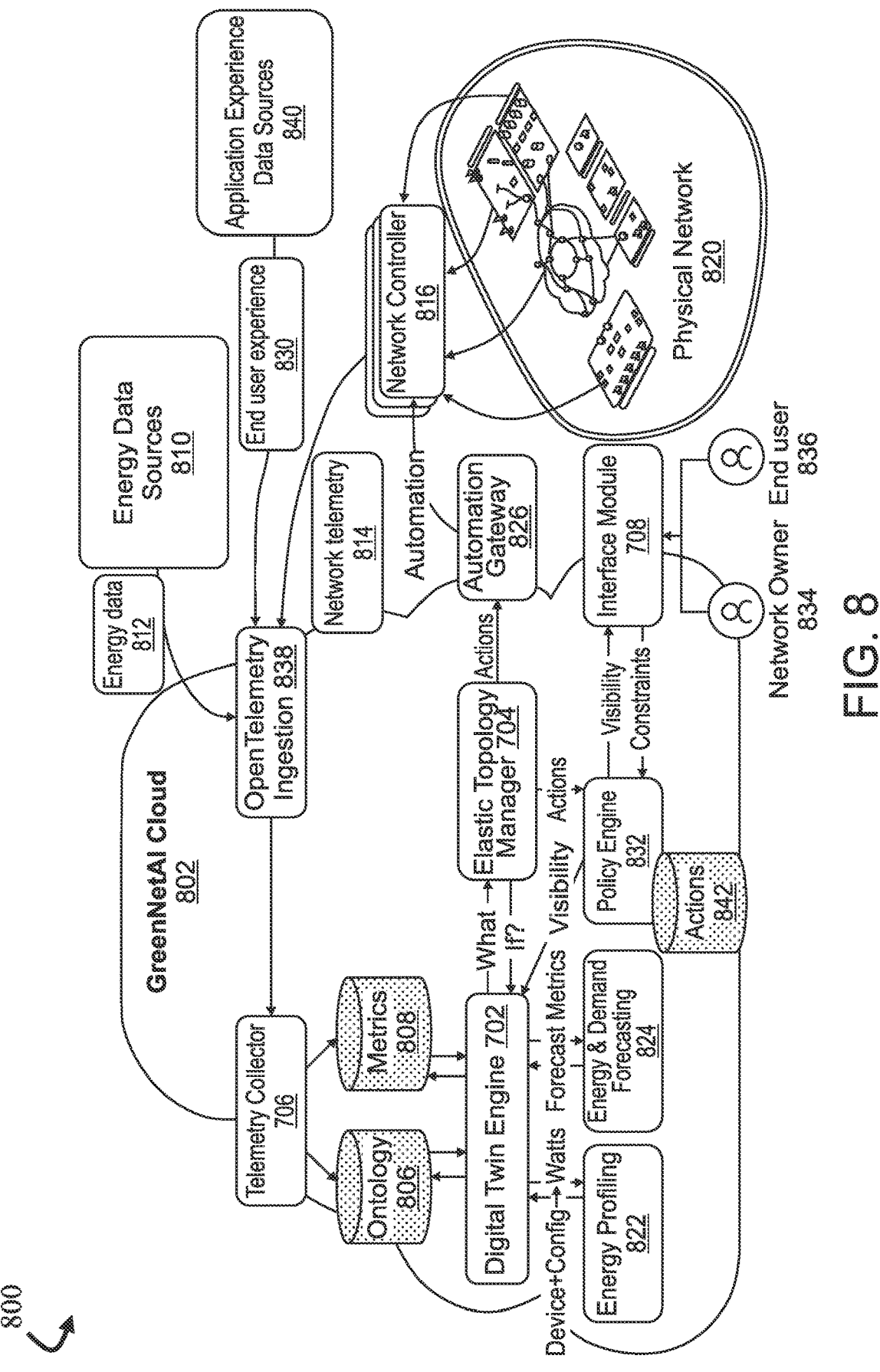
FIG. 8 illustrates an example of the interactions of the components of FIG. 7 in an AI-driven elastic network.

The interactions of the components of architecture 700 are shown in greater detail in FIG. 8 to implement a GreenNetAI cloud 802, in various embodiments. As shown in architecture 800 in FIG. 8, GreenNetAI cloud 802 may exist on top of a physical network 820 controlled by any number of network controllers 816 (e.g., SDN controller 408, etc.).

According to various embodiments, GreenNetAI cloud 802 may rely on a digital twin of physical network 820 to perform its energy-conscious optimizations. To this end, telemetry collector 706 may obtain various information from physical network 820, energy data sources 810, and/or application experience data sources 840, to form a digital twin of physical network 820. In some implementations, telemetry collector 706 may obtain any or all of this information via an OpenTelemetry-based ingestion mechanism 838. However, further implementations provide for telemetry collector 706 doing so by making API calls, accessing one or more data brokers, or the like, either on a pull or push basis.

More specifically, telemetry collector 706 may obtain network telemetry 814 from various entities associated with physical network 820, such as network controllers 816. For instance, network telemetry 814 may include information regarding the state of physical network 820 such as topology information, device information, configuration information, path metrics, routing information, direct energy consumption measurements, or any other information needed from physical network 820 to form a digital twin of physical network 820.

Telemetry collector 706 may also obtain energy data 812 from energy data sources 810. By way of example, energy data sources 810 may include, but are not limited to, services such as Electricity Maps, re.alto, FlatPeak, or the like, that provide energy data 812 (e.g., via various APIs, etc.). In general, energy data 812 may indicate information such as, but not limited to, the energy consumption by the various locations of physical network 820, energy costs, energy demand and supply information, and the like.

Telemetry collector 706 may further obtain QoE telemetry 830 from application experience data sources 840 that is indicative of the experience of an end user, such as end user 836 of the network. For instance, application experience data sources 840 may include services such as ThousandEyes, Nexthink, Aternity, 1E Solutions, Lakeside, or other services that are able to capture digital employee experience (DEX) information that can be included in QoE telemetry 830.

According to various embodiments, network optimization process 248 may represent physical network 820 as a digital twin using the information collected by telemetry collector 706. To this end, network optimization process 248 may rely on two primary building blocks: an ontology 806, stored in a relational database such as EdgeDB or PostgreSQL, and metrics 808, stored in a time-series database such as QuestDB. Generally, ontology 806 maps every network device, user, applications, and flows in physical network 820 to a digital equivalent, stored in database. Meanwhile, metrics 808 may store quantitative, time-varying data corresponding to each entity of ontology 806.

For instance, ontology 806 may represent a router as an entry in a Device table of its underlying database. Each interface of the router is represented in the Interface table, and a relation between them is defined. An application flow originating from a user's laptop, such as end user 836, to an application server in the cloud may be represented in a TrafficFlow table, with relations to both the laptop's and server's entries in an Endpoint table of the database.

A plurality of metrics in metrics 808 may be associated with each such entity in ontology 806. For instance, metrics bytes_per_sec and packets_per_sec can be associated with every entry in the TrafficFlow table. Metrics joule_per_bytes (i.e., traffic-dependent energy consumption) or baseline_power (i.e., baseline energy consumption, even in absence of traffic) can be associated with an interface, a chip, a blade, or an entire device. Physical entities such as routers, switches, and servers may associated with Location entries, for which metrics such as usd_per_watthour and kg_co2_eq_per_watthour, which denote the price in USD per watt hour and the kilograms of Carbon Dioxide (CO2) equivalent of greenhouse gas (GHG) emissions for 1 watt hour, which may be included in energy data 812 from energy data sources 810, which may provide electricity cost and carbon footprint per location across the world. Similarly, metrics 808 may also relate QoE telemetry 830 and/or network telemetry 814 with their corresponding entities in ontology 806.

In various embodiments, digital twin engine 702 may be responsible for reading the data stored in ontology 806 and metrics 808, to perform any or all of the following tasks:

1. Infer missing data: for instance, this may be the case of joule_per_bytes and baseline_power for device components (e.g., interfaces, chipsets, etc.) for which direct power consumption readings are not available. In this case, digital twin engine 702 may make use of an energy profiling module 822 (e.g., a subcomponent of digital twin engine 702) that is configured to estimate the value of joule_per_bytes or baseline_power. Energy profiling module 822 is described in greater detail below.

2. Forecast data: another capability of GreenNetAI cloud 802 is its ability to proactively power on or off some network devices and infrastructure in physical network 820, based on the estimated energy cost, demand, and supply. To this end, digital twin engine 702 may also rely on another subcomponent of it: energy and demand forecasting engine 824.

3. Simulate what-if scenarios: to ensure that any actions taken by GreenNetAI cloud 802 do not inadvertently cause undesired effects, digital twin engine 702 may also leverage a what-if engine subcomponent (not shown) to assess the outcome of a given action, both in terms of the resulting power consumption or carbon footprint, but also in terms of the impact on the end user experience. To do so, digital twin engine 702 must be able to simulate an alternate view of physical network 820 wherein one or more changes have been applied, and infer key metrics of interest (e.g., energy consumption, traffic load, etc.).

In various implementations, elastic topology manager 704 may be responsible for minimizing the energy consumption of physical network 820 (e.g., in terms of GHG emissions, energy costs, power or energy consumption, etc.), given a set of operational constraints, such as maintaining user experience metrics (UEM) above a given threshold for different applications, or limiting the risk of connectivity failure in different scenarios (single/double link/node failures). To this end, elastic topology manager 704 may rely on a subcomponent, policy engine 832, which is responsible for maintaining a set of allowed and disallowed actions 842, based on these constraints. Indeed, depending on the number of users in physical network 820, the types of applications they use, etc., different requirements may be inferred and used to formulate policies for policy engine 832. For instance, banks and hospitals may have very strict operational requirements at the expense of additional energy consumption, whereas retail, entertainment, or smaller businesses may be more flexible in terms of their operational requirements, allowing for even greater reductions in the energy consumption of physical network 820. Policy engine 832 may also provide some visibility as to the constraints during any what-if assessments of potential actions 842.

In various embodiments, elastic topology manager 704 may proceed as follows:

1. Query digital twin engine 702 for the current state of physical network 820, based on its digital twin.
2. Identify saving opportunities (e.g., redundant paths, over-provisioned devices, movable or deferrable workloads) and produce an estimated saving.
3. Simulate the changes using digital twin engine 702 and validate that they remain within operational constraints maintained by policy engine 832 (e.g., link loads below 80%, single-link failure protection).
4. Generate recommendations and or apply the change via an automation gateway 826.

The list of actions 842 triggered elastic topology manager 704 to reduce energy consumption while preserving QoE/DEX can be quite varied. For instance, set of allowed and disallowed actions 842 may include, but are not limited to, the computation of a sub-network for physical network 820, the performance of traffic classification and discrimination in physical network 820, to mention a few.

Automation gateway 826 then translates these changes into API queries to the various controllers. In some instance, automation gateway 826 provides a multi-controller, multi-vendor abstraction over the underlying network controllers 816. Because not all actions 842 may be supported by them, automation gateway 826 may also support a "dry run" mode, which allows elastic topology manager 704 to test whether the changes are possible and adjust the plan, accordingly. In various implementations, automation gateway 826 may be activated by a user or via an automation engine in charge of triggering changes after various verifications.

Here, the optimization of physical network 820 does not involve simply reducing its energy consumption at all cost, but doing so such that the QoE/DEX remains at an acceptable level. To this end, elastic topology manager 704 may also take into account QoE telemetry 830 from application experience data sources 840, to assess the impact of changes made in the past. If any adverse effect is noticed, it may revert the changes and adjust any corresponding operational constraints, accordingly. To do so, energy profiling module 822 may also specify which QoE/DEX metrics should be monitored to reflect the user experience in physical network 820.

Should the QoE/DEX become unsatisfactory (e.g., the required SLA for an application is no longer satisfied), elastic topology manager 704 may also undo any of its implemented actions 842, so as to reverse physical network 820 to its previous network state. In such a case, digital twin engine 702 and elastic topology manager 704 may also adjust their algorithms using detailed information about the stored states of 820 before and after triggering the changes along with the noticed impact on the QoE/DEX. Elastic topology manager 704 may then use this negative information to refine its energy saving optimization and corresponding model(s).

As shown in FIGS. 7-8, network optimization process 248 may also include an interface module 708 that allows interested users such as network owner 834 and/or end user 836 to monitor the on-going status of GreenNetAI cloud 802 and its underlying physical network 820. To this end, user interface module 708 may provide a user interface and/or API that allow such a user to:

Visualize the saving opportunities that were captured, and those that were not, either due to limitations of the network (e.g., unsupported actions) or due to operational constraints (e.g., double-link failure protection). These opportunities may be mapped onto the different areas of the network and can be explored either in a table (e.g., ordered by saving magnitude, in USD or kg of Co2-eq) or using a topology visualization.

Provide feedback to the system about potential impacts to the user experience. This can be then used to adjust the operational constraints automatically and/or to improve the internal models used by elastic topology manager 704 to infer the impact of the changes.

Making a What-If Scenario Evaluation in a Green Elastic Network With Partial Traffic and Topology Information As would be appreciated, an important component of GreenNetAI cloud 802 is digital twin engine 702 and its ability to perform what-if scenarios, i.e., counterfactually determining the outcome of a given action (e.g., shutdown an interface on a switch or route traffic via a different path), both in terms of the resulting power consumption and/or carbon footprint, but also in terms of impact on the end user experience by estimating the new traffic load on all links and devices of the network. Generally, the digital twin must be able to simulate an alternate view of the network for which one or more changes have been applied and infer key metrics of interest (e.g., energy consumption, traffic load, etc.). To this end, the techniques herein further introduce a strategy that lies at the intersection of simulation and machine learning, by combining ordinary and/or stochastic differential equations (ODEs and SDEs), and differential programming.

Figure 9:
FIG. 9 illustrates an example architecture for making a what-if scenario evaluation in a green elastic network with partial traffic and topology information.

FIG. 9 illustrates an example architecture 900 for making a what-if scenario evaluation in a green elastic network with partial traffic and topology information. Continuing the example above of GreenNetAI cloud 802, at the core of architecture 900 is digital twin engine 702, which may include sub-components energy profiling module 822 and energy and demand forecasting engine 824, described previously. In further embodiments, digital twin engine 702 may also include any or all of the following sub-components: a topology generator 902, a usage pattern analyzer 904, and/or a what-if engine 906. As would be appreciated, these sub-components may be combined or omitted, as desired. In addition, in cases in which these sub-components are executed in a distributed manner, the executing devices can be seen as a singular device for purposes of the teachings herein.

Figure 10:
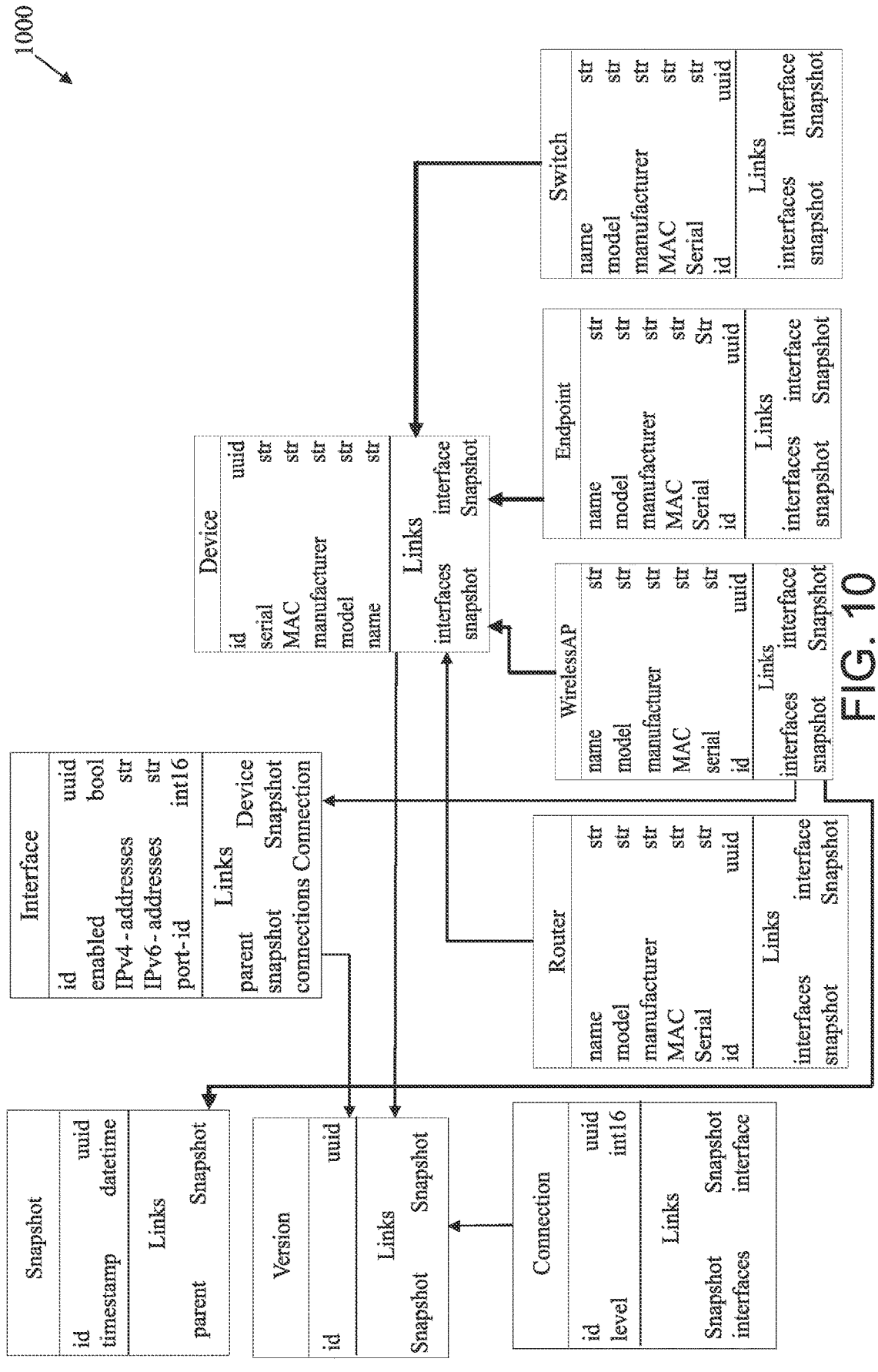
FIG. 10 illustrates an example database schema relating network entities.

As noted above, digital twin engine 702 may represent a digital twin of physical network 820 in part by representing its entities and their relations in ontology 806. In some implementations, ontology 806 may take the form of a graph-relational database schema. By way of example, FIG. 10 illustrates an example database schema 1000 relating network entities, such as a router, wireless access point (AP), endpoint, switch, interface, etc. in physical network 820. In some implementations, relationships in database schema

1000 can be of three types: 1.) inheritance (e.g., a router inherits from device), 1.) composition (e.g., a device has multiple interfaces) or 3.) association (e.g., an interface can be connected to another interface at the physical level).

Figure 11:
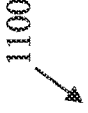
FIG. 11 illustrates an example query for a network topology.

According to various embodiments, topology generator 902 may be responsible for querying the database storing ontology 806 at a given level (e.g., a given layer of the OSI model, etc.). By way of example, FIG. 11 illustrates an example query 1100 for a network topology that topology generator 902 could issue to the database storing ontology 806. As shown, query 1100 seeks to identify the entire topology of physical network 820 excluding its endpoints. FIG. 12 illustrates an example topology 1200 retrieved using query 1100.

Typically, the topology generated by topology generator 902 is a graph whose vertices are network elements (routers, switches, etc.), some of which can be shut down entirely or put in a degraded mode (thus saving energy). Each vertex may be annotated with properties such as the capacity (on a per interface basis) and the latency (e.g., in ms). The edges of the graph represent network links between the elements, annotated with properties such as the capacity (in kbps), the reliability (in average packet loss), and the latency (in ms). Of course, such operations influence the traffic flows carried by the different links, and the goal is to understand the impact of an arbitrary set of changes.

In various embodiments, usage pattern analyzer 904 may take as input the graph representation of the topology generated by topology generator 902 and the current or predicted usage patterns, as provided by energy and demand forecasting engine 824. Given a set of (source, destination, load) tuples and the network topology, usage pattern analyzer 904 may then build an equivalent mathematical system of ordinary differential equations (ODE):

$$y(0) = y_0$$
$$F(t, y(t)) = b + (y(t) \cdot F - y(t))$$

where y(t) is the load on each link at time t, b are the so-called boundary conditions, which correspond to the inflow and outflow of traffic at edges of the network (i.e., sent and received by the WAN and the endpoints, respectively), and F is the (unspecified) forwarding matrix, which determines how each node forwards traffic destined to its neighbors.

Figure 13A:
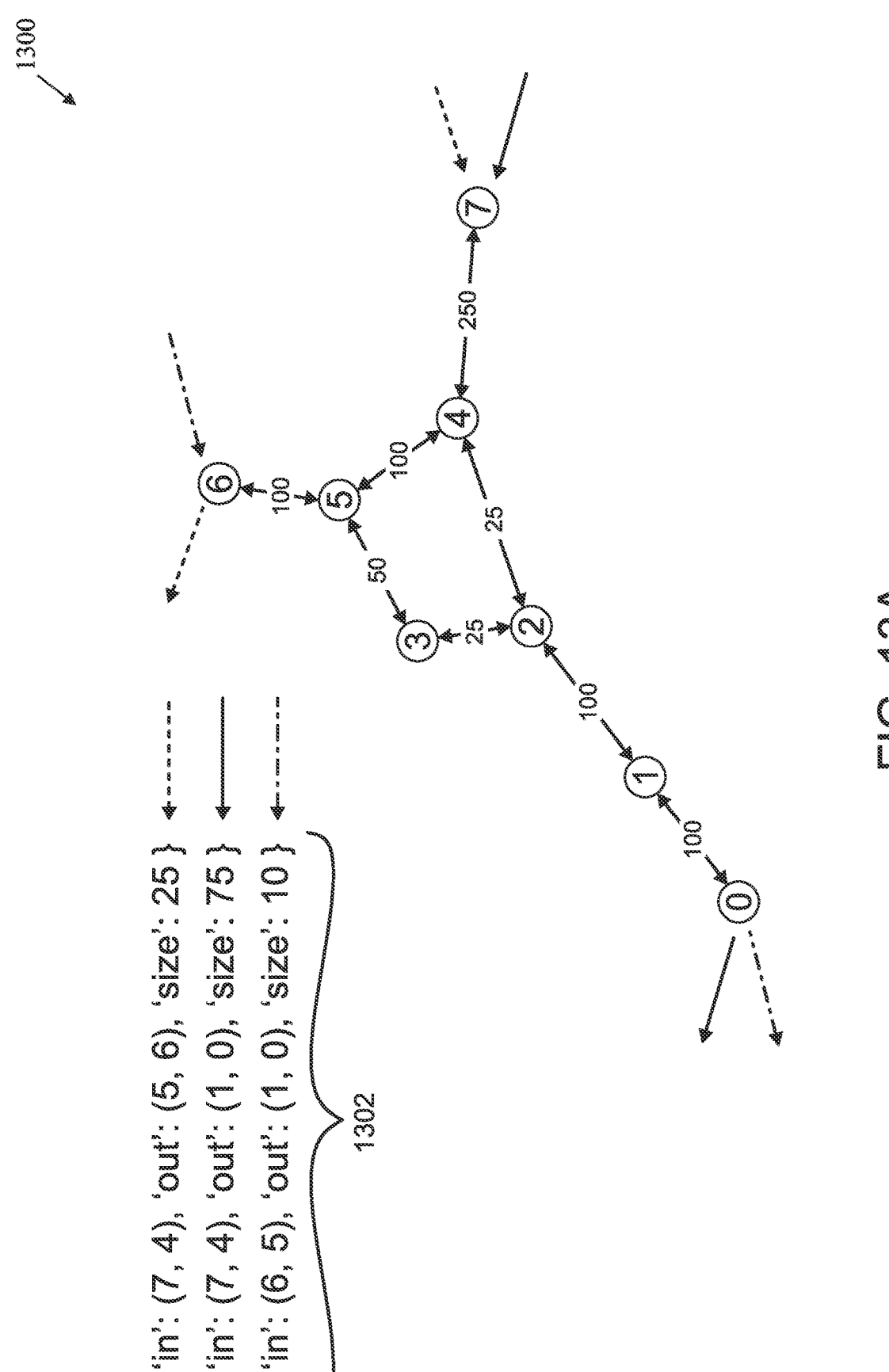

Importantly, given a F, this system converges to an equilibrium, which usage pattern analyzer 904 could solve using any suitable algorithm for solving ordinary differential equations. For instance, FIGS. 13A-13B illustrate an example of solving a differential equation-based representation of a network topology. More specifically, as shown in example 1300 in FIG. 13A, consider a simple topology with seven network entities represented as graph nodes that are interconnected with one another as shown.

Here, an ordinary differential equation can represent the three traffic flows 1302 flowing through the topology of sizes 25, 75, and 10, respectively. Note that the term 'flow' in this sense is intended to be viewed broadly and doesn't necessarily denote a 5-tuple in the sense of IPFIX. FIG. 13B illustrates a plot 1310 of the respective loads across the different links in the topology in FIG. 13A from solving the ordinary differential equation.

Another responsibility of usage pattern analyzer 904 is to determine F which, as mentioned, is unspecified, at least in principle. However, since usage pattern analyzer 904 includes a differentiable ODE solver, it may infer F from observational data by performing gradient descent through the solver itself. The loss that usage pattern analyzer 904 may use in this context may depends heavily on the implementation and its objectives, but one candidate is the norm (L1 or L2) of the vector θ=y*–yhat, where y* are observed traffic loads, and yhat are predicted ones. Importantly, usage pattern analyzer 904 can perform this optimization even when y* is sparse, i.e., not all links are observed. Of course, the outcome is then only an estimate of the true load, but one that is consistent with the observed data.

Now, simply computing F and the resulting load of all links yF for the current load only tells part of the story and usage pattern analyzer 904 may also determine the future load for purposes of identifying what-if scenarios. To do so, it can be assumed that the forwarding matrix F does not change, so usage pattern analyzer 904 can simply compute the new equilibrium using the predicted demand (i.e., an updated set of flows).

However, for counterfactual, what-if situations, usage pattern analyzer 904 may use a different strategy, as F is again unknown. In this case, usage pattern analyzer 904 may rely on a neural ODE, whereby the expression in the above equation is replaced by a neural network, which takes y (t) as input and yield a vector of identical dimension, which corresponds to the differential of traffic on each link resulting from the forwarding process. Now, because this is a neural network, usage pattern analyzer 904 can condition its output on a variety of parameters, such as whether the degraded modes or features enabled on network devices, and the downgrading or shutting down of interfaces. Now that this neural network can also take the form of a graph neural network, accounting for the intrinsic topology of the network.

Contrary to the earlier approach, where there would be in principle a single solution and usage pattern analyzer 904 can learn F from a single sample or a few samples, there are now a lot more degrees of freedom that the neural network must learn, meaning that the system must observe the network for an extended period, which must include situations where changes have been applied. As a result, usage pattern analyzer 904 may learn from events that have been previously approved by a user, and/or performed during 'low-risk' periods or in 'low-risk' areas of physical network 820. Another strategy, which might be more fitting for sensitive networks, would be for usage pattern analyzer 904 to learn from either simulated or lab networks.

What-if engine 906 may then use usage pattern analyzer 904 to evaluate various possibilities with respect to potential actions in physical network 820. For instance, what-if engine 906 may assess the effects of turning off the interface of a certain switch to assess not only the potential energy savings in doing so, but also the effects on the bandwidth consumption in the network that would result from doing so.

In some instances, what-if engine 906 may also interact with user interface module 708 to provide a user interface for display to an administrator. Such a user interface may allow them to query what-if engine 906 and/or validate actions or scenarios before elastic topology manager 704 applies them to physical network 820. Such interactions may help for the system to establish trust with users of the system.

In addition, as noted above, what-if engine 906 may interact with policy engine 832 in some embodiments, and specifically its "suggested template" capability, which allows it to auto-generate policies that would lead to energy savings within the constraints specified by the users. In this situation, what-if engine 906 may be required to estimate the energy savings and validate that no policy violation occurs.

Figure 14:
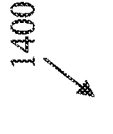
FIG. 14 illustrates an example simplified procedure for making a what-if scenario evaluation in a green elastic network with partial traffic and topology information.

FIG. 14 illustrates an example simplified procedure (e.g., a method) for making a what-if scenario evaluation in a green elastic network with partial traffic and topology information, in accordance with one or more implementations described herein. For example, a non-generic, specifically configured device (e.g., device 200), such as a router, firewall, controller for a network (e.g., an SDN controller or other device in communication therewith, s cloud controller, etc.), server, or the like, may perform procedure 1400 by executing stored instructions (e.g., network optimization process 248). In some instances, a set of distributed, specifically configured devices may also perform procedure 1400, in which case the set of devices can themselves be viewed as a singular device for purposes of the teachings herein. The procedure 1400 may start at step 1405, and continues to step 1410, where, as described in greater detail above, the device may query an ontology that represents entities in a computer network and their relationships for a particular topology in the computer network. In some cases, the particular topology is a subset of a complete topology of the computer network. In one implementation, the ontology is stored in a graph-relational database schema. In a further instance, the portion of the particular topology excludes at least one link between entities in the particular topology.

At step 1415, as detailed above, the device may compute a mathematical system that represents traffic in the particular topology, based on traffic for only a portion of the particular topology. In some implementations, the mathematical system comprises a neural ordinary differential equation. In one implementation, the neural ordinary differential equation comprises a neural network that conditions its output on the potential change to the particular topology. In various implementations, the traffic for only the portion of the particular topology is obtained from a lab-based replica of the computer network or a simulation of the computer network.

At step 1420, the device may use the mathematical system to compute traffic in the particular topology for a potential change to the particular topology expected to reduce energy consumption by the computer network, as described in greater detail above. In some instances, the potential change comprises shutting down an interface on a switch in the computer network or routing traffic in the computer network via a different path.

At step 1425, as detailed above, the device may cause, based in part on the traffic computed using the mathematical system, the potential change to be made to the computer network. In some implementations, the device causes the potential change to be made to the computer network when the traffic computed using the mathematical system will not violate a performance policy for the computer network. In some cases, the device may also provide an indication of the potential change and the traffic computed using the mathematical system to a user interface for review, prior to causing the potential change to be made to the computer network.

Procedure 1400 then ends at step 1430.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, introduce approaches for making a what-if scenario evaluation in a green elastic network with partial traffic and topology information, in elastic networks designed to reduce energy consumption while maintaining DEX/QoE, according to specific constraints and objectives. This approach to maintaining DEX/QoE leverages digital twins, various models (e.g., for energy consumption, etc.), network state retrievals, and/or the monitoring of network QoE and SLA metrics in the form of positive/negative feedback.

According to various embodiments, a method is introduced herein comprising querying, by a device, an ontology that represents entities in a computer network and their relationships for a particular topology in the computer network. The method may also comprise computing, by the device, a mathematical system that represents traffic in the particular topology, based on traffic for only a portion of the particular topology. The method may further comprise using, by the device, the mathematical system to compute traffic in the particular topology for a potential change to the particular topology expected to reduce energy consumption by the computer network. The method may additionally comprise causing, by the device and based in part on the traffic computed using the mathematical system, the potential change to be made to the computer network.

In some embodiments, the potential change comprises shutting down an interface on a switch in the computer network or routing traffic in the computer network via a different path. In another embodiment, the particular topology is a subset of a complete topology of the computer network. In another embodiment, the ontology is stored in a graph-relational database schema. In a further embodiment, the mathematical system comprises a neural ordinary differential equation. In some embodiments, the neural ordinary differential equation comprises a neural network that conditions its output on the potential change to the particular topology. In another embodiment, the portion of the particular topology excludes at least one link between entities in the particular topology. In some embodiments, the device causes the potential change to be made to the computer network when the traffic computed using the mathematical system will not violate a performance policy for the computer network. In one embodiment, the traffic for only the portion of the particular topology is obtained from a lab-based replica of the computer network or a simulation of the computer network. In yet another embodiment, the method further comprises providing, by the device, an indication of the potential change and the traffic computed using the mathematical system to a user interface for review, prior to causing the potential change to be made to the computer network.

Further, according to the embodiments herein an apparatus herein may comprise: one or more network interfaces to communicate with a network; a processor coupled to the one or more network interfaces and configured to execute one or more processes; and a memory configured to store a process executable by the processor, the process, when executed, configured to query an ontology that represents entities in a computer network and their relationships for a particular topology in the computer network. The process when executed is also configured to compute a mathematical system that represents traffic in the particular topology, based on traffic for only a portion of the particular topology. When executed, the process is further configured to train a machine learning model to use the mathematical system to compute traffic in the particular topology for a potential change to the particular topology expected to reduce energy consumption by the computer network. The process when executed is additionally configured to cause, based in part on the traffic computed using the mathematical system, the potential change to be made to the computer network.

According to the embodiments herein, a tangible, non-transitory, computer-readable medium herein may have program instructions stored thereon that, when executed by a device, may cause the computer to perform a method comprising querying, by the device, an ontology that represents entities in a computer network and their relationships for a particular topology in the computer network. The method may also comprise computing, by the device, a mathematical system that represents traffic in the particular topology, based on traffic for only a portion of the particular topology. The method may further comprise using, by the device, the mathematical system to compute traffic in the particular topology for a potential change to the particular topology expected to reduce energy consumption by the computer network. The method may additionally comprise causing, by the device and based in part on the traffic computed using the mathematical system, the potential change to be made to the computer network.

While there have been shown and described illustrative implementations that provide for making a what-if scenario evaluation in a green elastic network with partial traffic and topology information, it is to be understood that various other adaptations and modifications may be made within the spirit and scope of the implementations herein. For example, while certain network adaptations are described herein with respect to achieving reduced resource consumption, examples are not limited as such and may involve other modifications, in other implementations. Likewise, a wide variety of resource consumption metrics may be targeted for minimization alongside or instead of those describe herein. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

querying, by a device, an ontology that represents entities in a computer network and their relationships for a particular topology in the computer network, wherein the ontology is stored in a graph-relational database schema;

computing, by the device, a mathematical system configured to represent traffic in the particular topology, based on obtained traffic for only a portion of the particular topology, wherein the mathematical system comprises a neural ordinary differential equation;

using, by the device, the mathematical system to compute representative traffic in the particular topology for a potential change to the particular topology expected to reduce energy consumption by the computer network; and causing, by the device and based in part on the representative traffic computed using the mathematical system, the potential change to be made to the computer network.

2. The method as in claim 1, wherein the potential change comprises shutting down an interface on a switch in the computer network or routing traffic in the computer network via a different path.

3. The method as in claim 1, wherein the particular topology is a subset of a complete topology of the computer network.

4. The method as in claim 1, wherein the neural ordinary differential equation comprises a neural network that conditions its output on the potential change to the particular topology.

5. The method as in claim 1, wherein the portion of the particular topology excludes at least one link between entities in the particular topology.

6. The method as in claim 1, wherein the device causes the potential change to be made to the computer network when the representative traffic computed using the mathematical system will not violate a performance policy for the computer network.

7. The method as in claim 1, wherein the obtained traffic for only the portion of the particular topology is obtained from a lab-based replica of the computer network or a simulation of the computer network.

8. The method as in claim 1, further comprising:

providing, by the device, an indication of the potential change and the representative traffic computed using the mathematical system to a user interface for review, prior to causing the potential change to be made to the computer network.

9. An apparatus, comprising:

one or more network interfaces;

a processor coupled to the one or more network interfaces and configured to execute one or more processes; and a memory configured to store a process that is executable by the processor, the process when executed configured to:

query an ontology that represents entities in a computer network and their relationships for a particular topology in the computer network, wherein the ontology is stored in a graph-relational database schema;

compute a mathematical system configured to represent traffic in the particular topology, based on obtained traffic for only a portion of the particular topology, wherein the mathematical system comprises a neural ordinary differential equation;

use the mathematical system to compute representative traffic in the particular topology for a potential change to the particular topology expected to reduce energy consumption by the computer network; and cause, based in part on the representative traffic computed using the mathematical system, the potential change to be made to the computer network.

10. The apparatus as in claim 9, wherein the potential change comprises shutting down an interface on a switch in the computer network or routing traffic in the computer network via a different path.

11. The apparatus as in claim 9, wherein the particular topology is a subset of a complete topology of the computer network.

12. The apparatus as in claim 9, wherein the neural ordinary differential equation comprises a neural network that conditions its output on the potential change to the particular topology.

13. The apparatus as in claim 9, wherein the portion of the particular topology excludes at least one link between entities in the particular topology.

14. The apparatus as in claim 9, wherein the apparatus causes the potential change to be made to the computer network when the representative traffic computed using the mathematical system will not violate a performance policy for the computer network.

15. The apparatus as in claim 9, wherein the obtained traffic for only the portion of the particular topology is obtained from a lab-based replica of the computer network or a simulation of the computer network.

16. A tangible, non-transitory, computer-readable medium storing program instructions that cause a device to execute a process comprising:

querying, by the device, an ontology that represents entities in a computer network and their relationships for a particular topology in the computer network, wherein the ontology is stored in a graph-relational database schema;

computing, by the device, a mathematical system configured to represent traffic in the particular topology, based on obtained traffic for only a portion of the particular topology, wherein the mathematical system comprises a neural ordinary differential equation;

using, by the device, the mathematical system to compute representative traffic in the particular topology for a potential change to the particular topology expected to reduce energy consumption by the computer network; and causing, by the device and based in part on the representative traffic computed using the mathematical system, the potential change to be made to the computer network.

17. The tangible, non-transitory, computer-readable medium of claim 16, wherein the potential change comprises shutting down an interface on a switch in the computer network or routing traffic in the computer network via a different path.

18. The tangible, non-transitory, computer-readable medium of claim 16, wherein the particular topology is a subset of a complete topology of the computer network.

19. The tangible, non-transitory, computer-readable medium of claim 16, wherein the neural ordinary differential equation comprises a neural network that conditions its output on the potential change to the particular topology.

20. The tangible, non-transitory, computer-readable medium of claim 16, wherein the portion of the particular topology excludes at least one link between entities in the particular topology.

* * * * *